Figure 1:
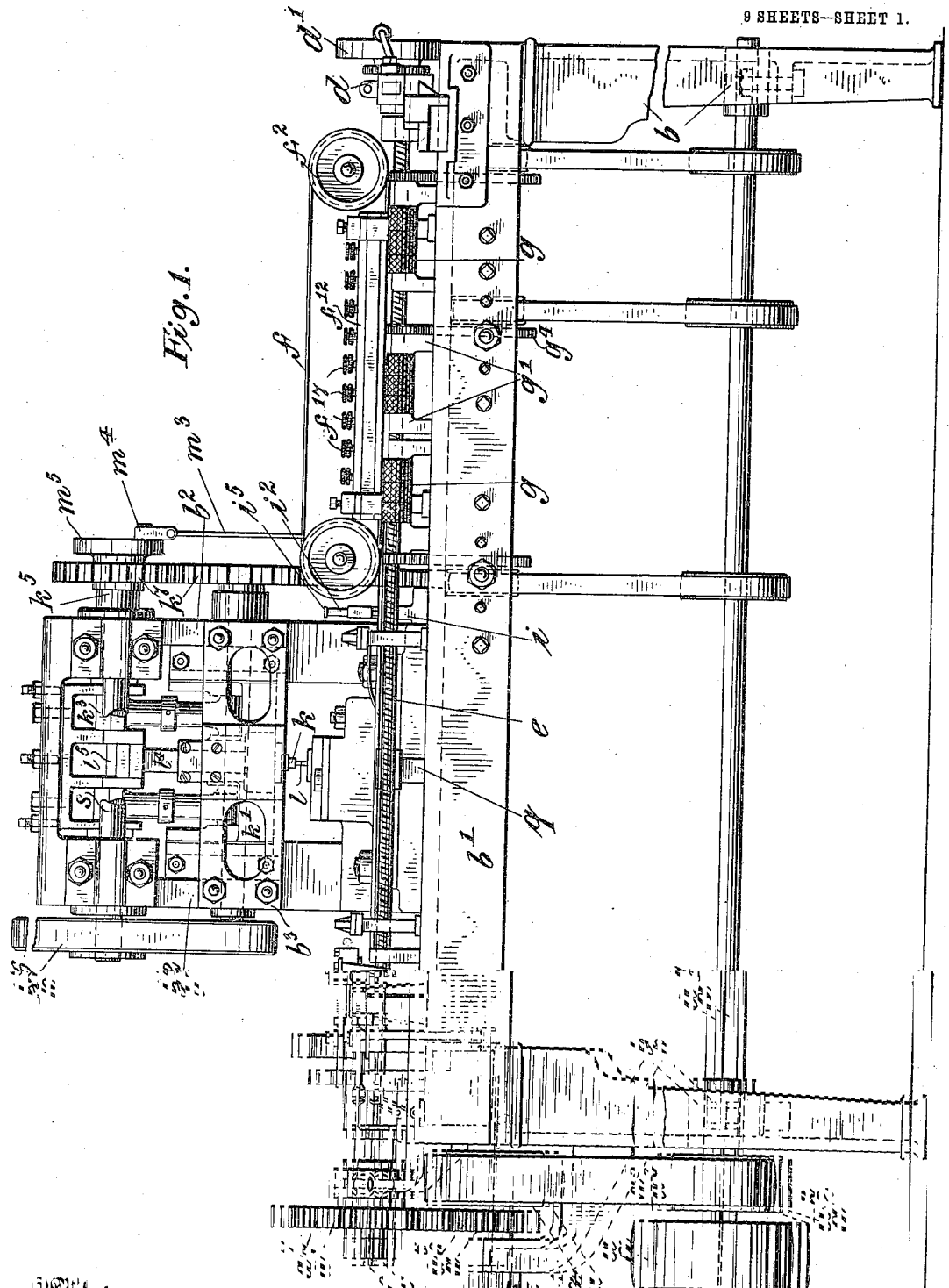

H. B. CHURCH.
MACHINE FOR MAKING SAFETY PINS.
APPLICATION FILED MAY 16, 1908.

962,126.

Patented June 21, 1910.

9 SHEETS—SHEET 1.

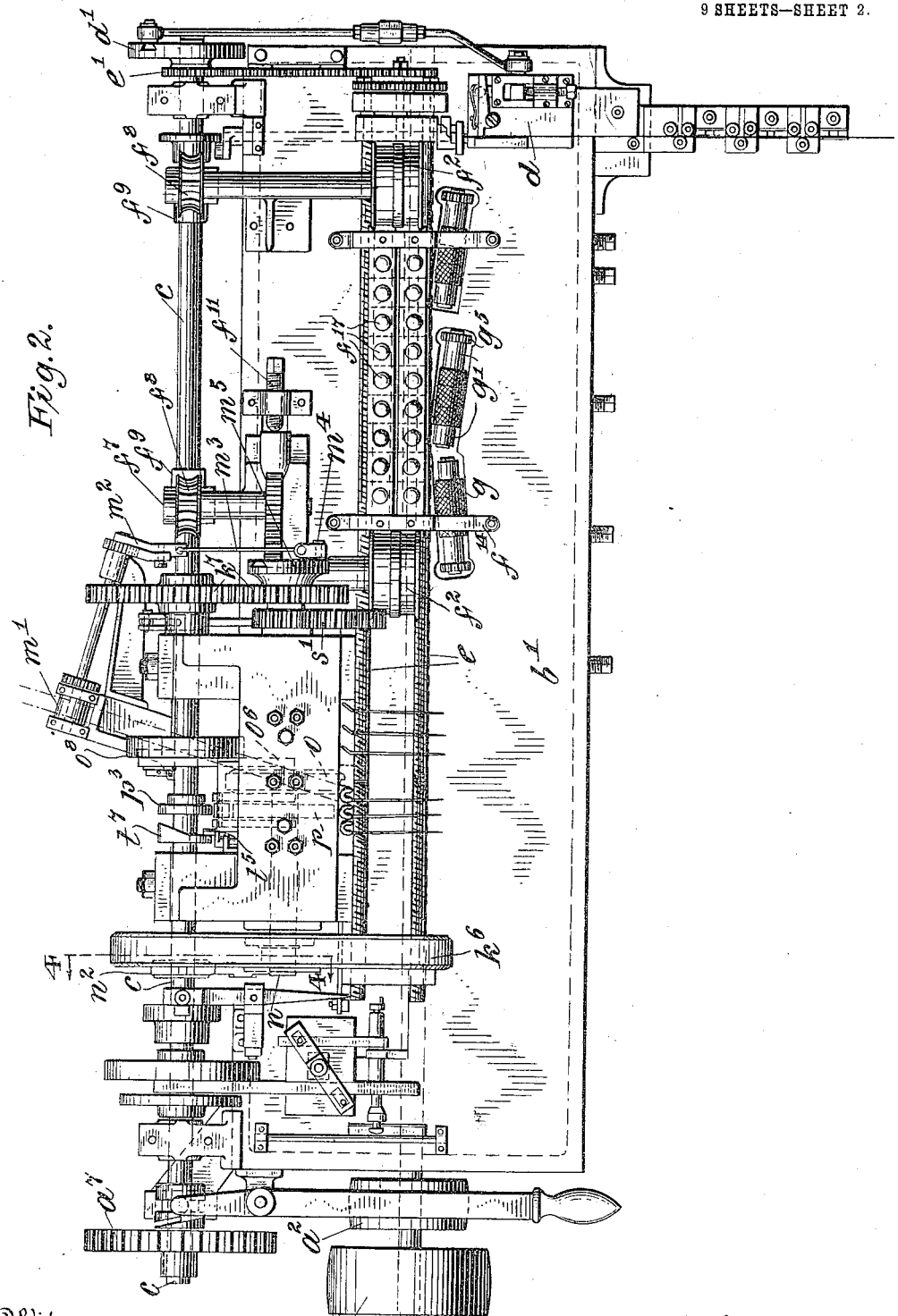

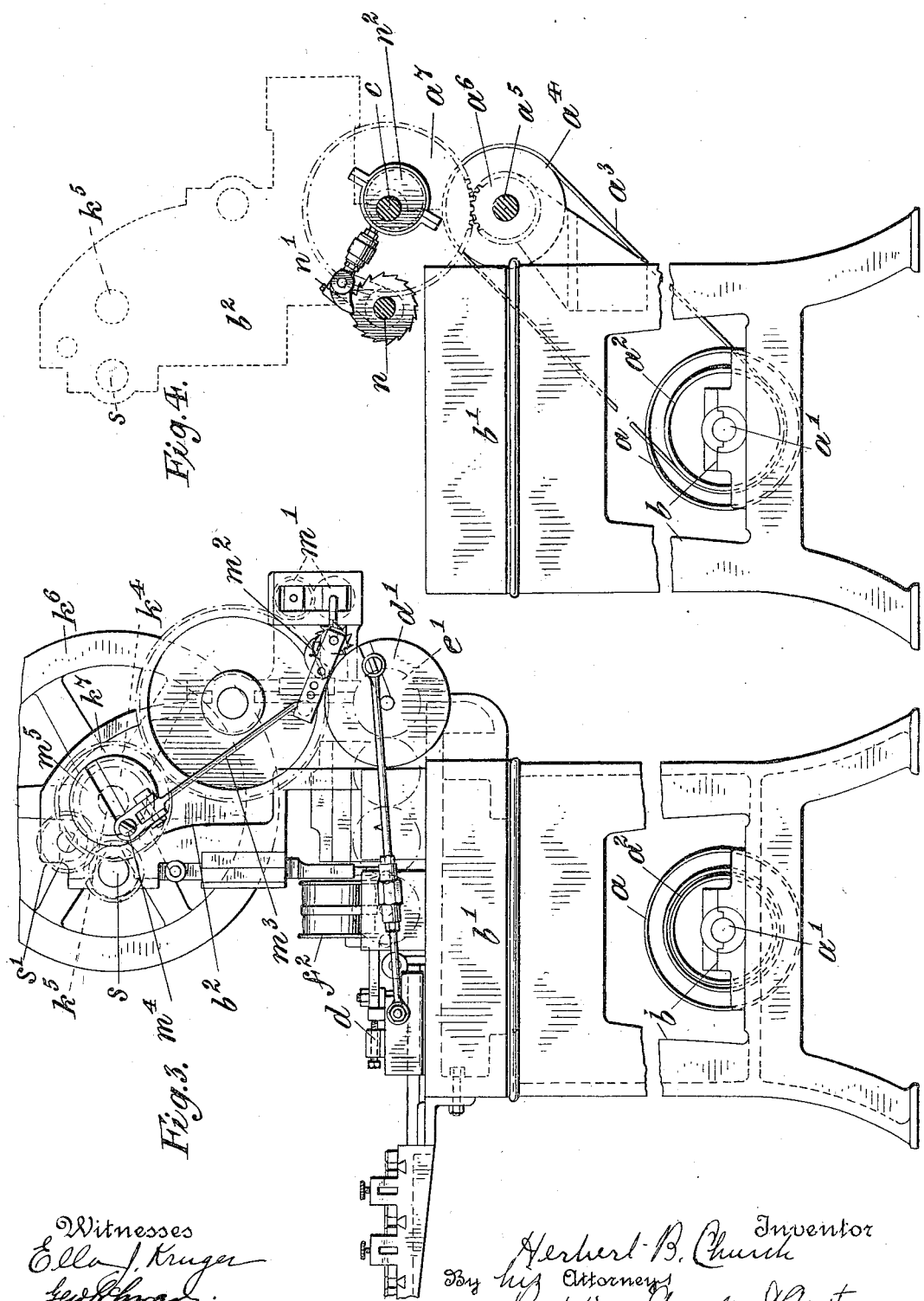

H. B. CHURCH.
MACHINE FOR MAKING SAFETY PINS.
APPLICATION FILED MAY 16, 1908.
962,126.
Patented June 21, 1910.
9 SHEETS—SHEET 4.
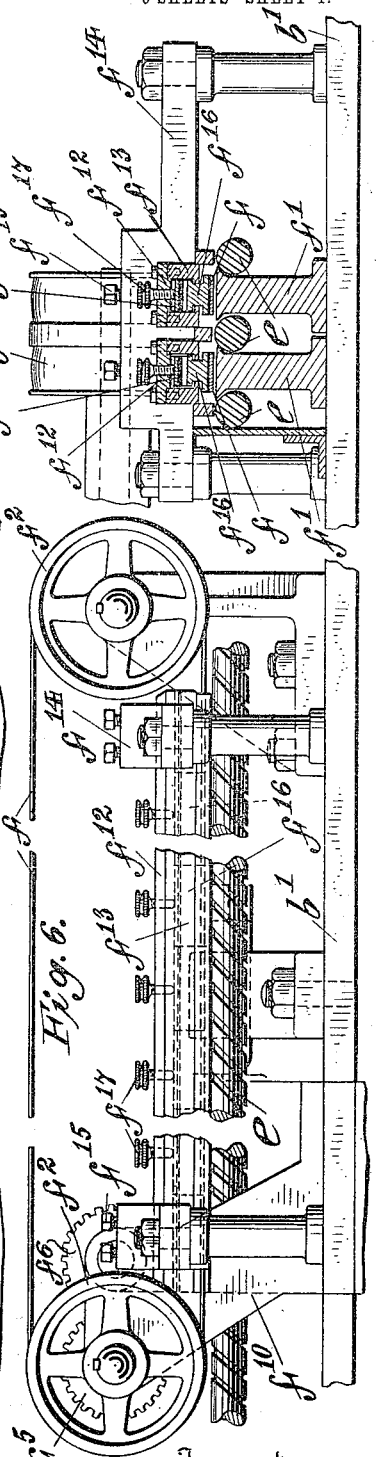
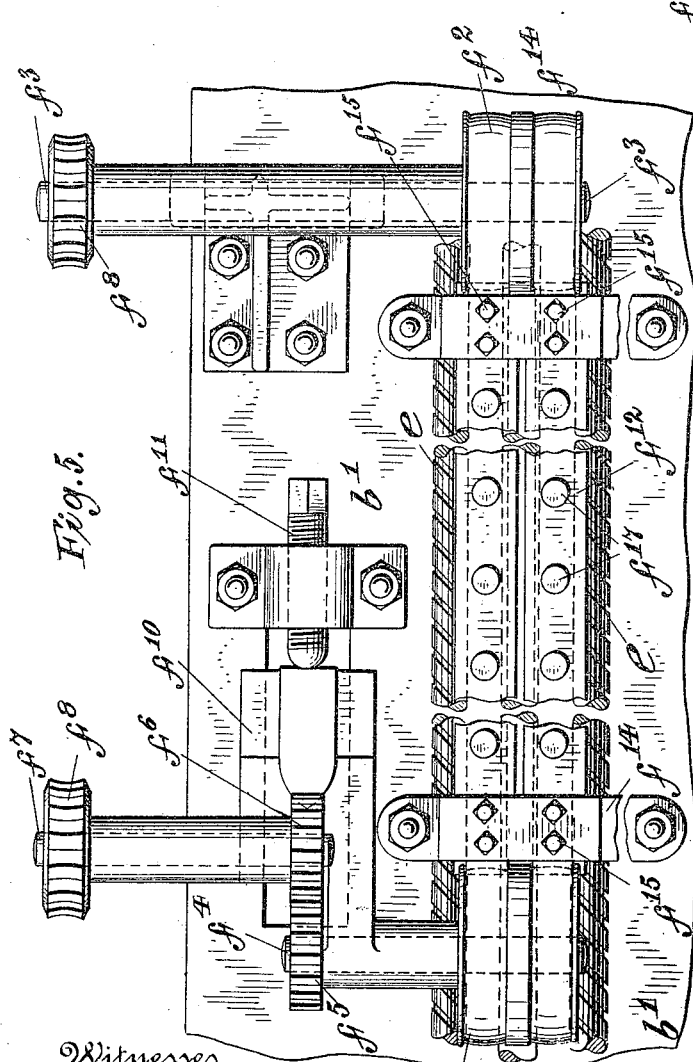

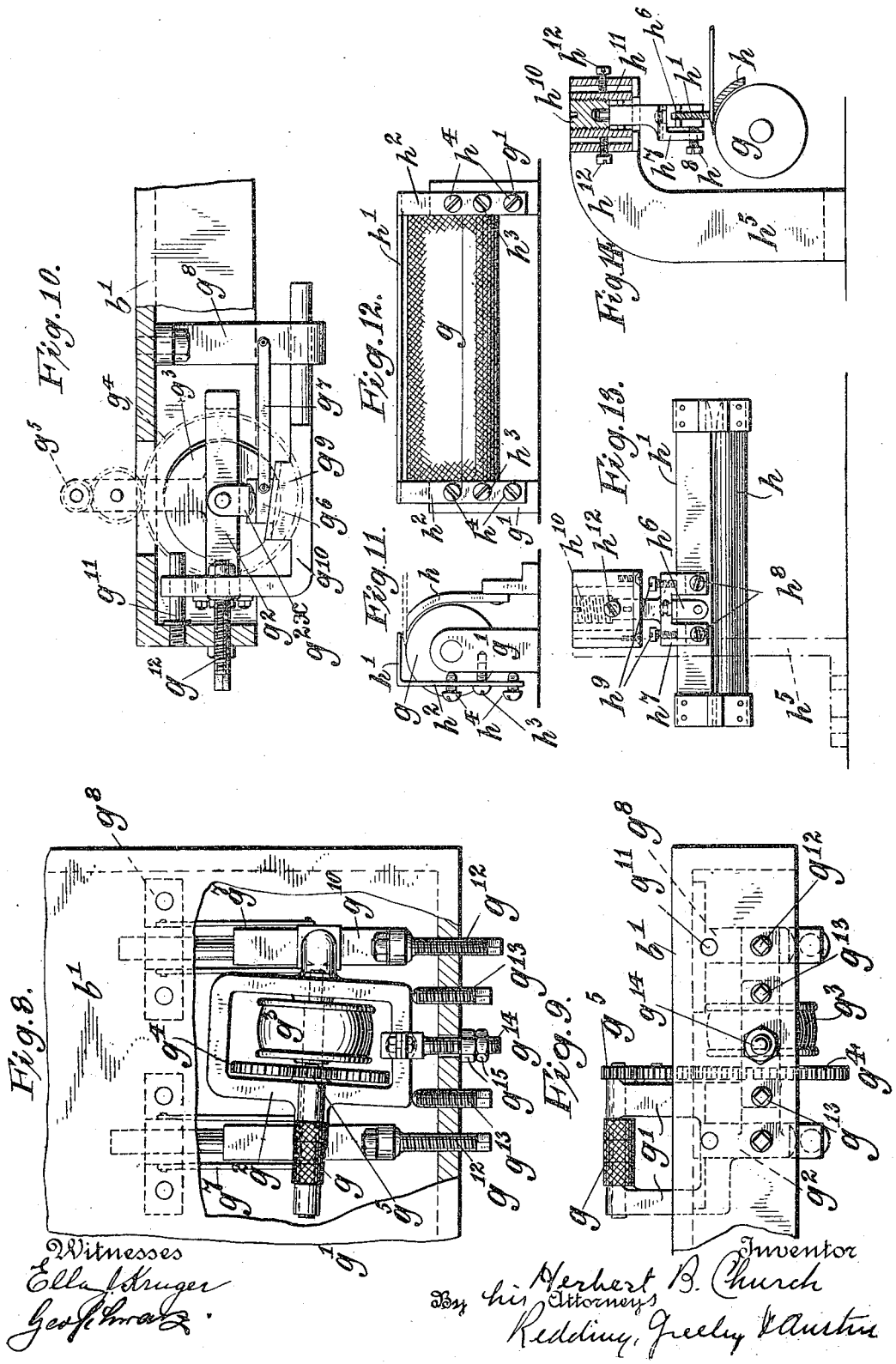

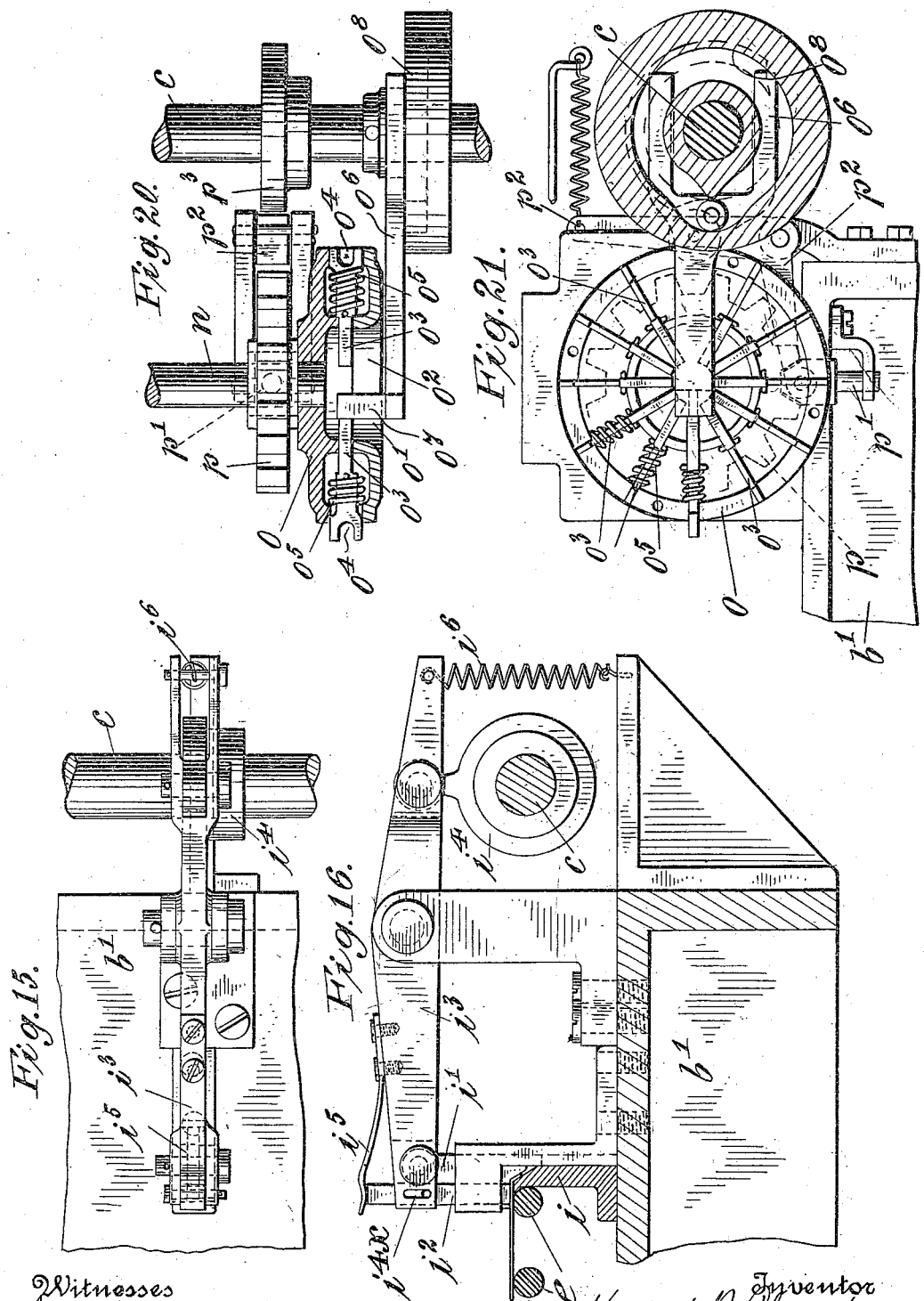

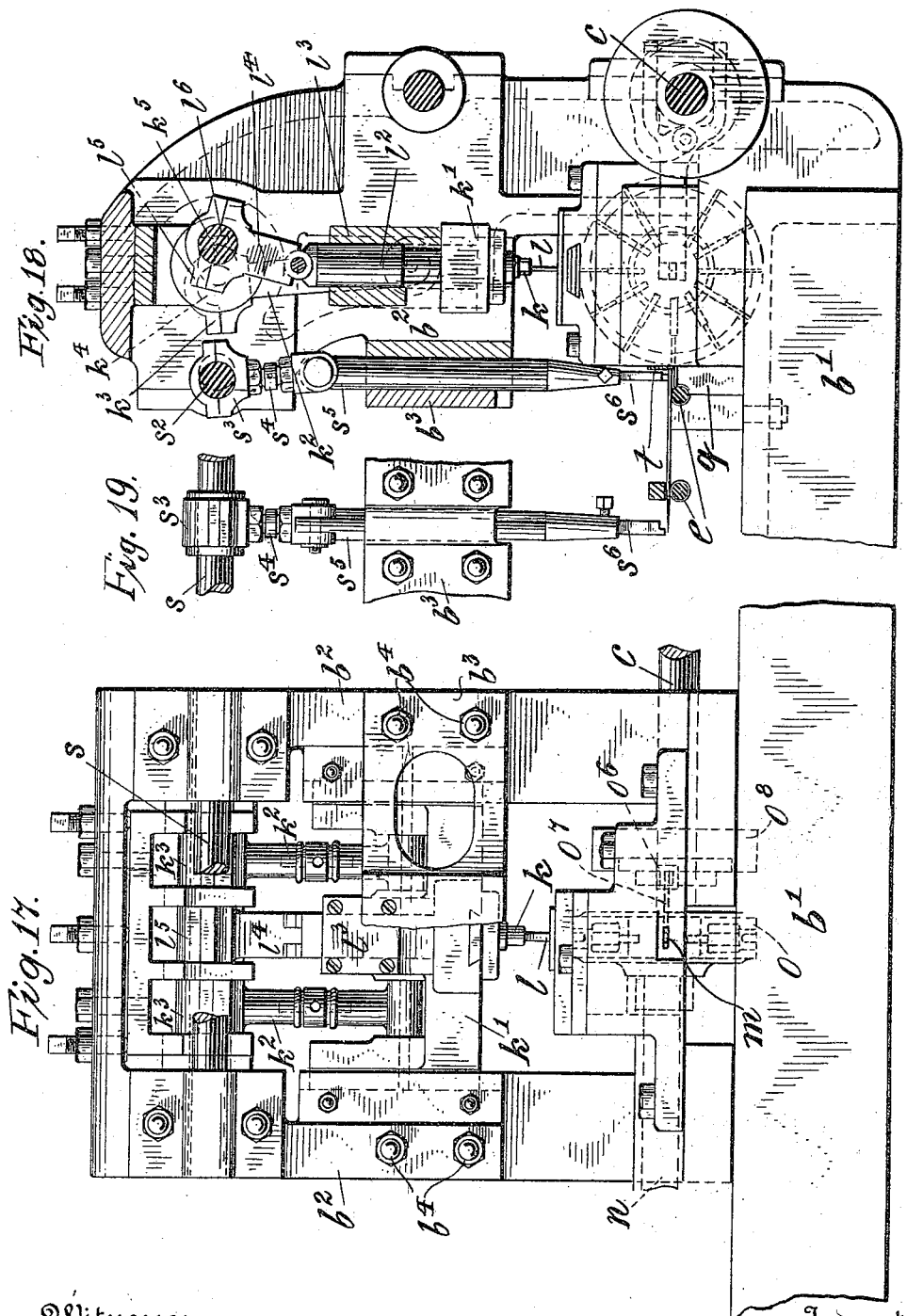

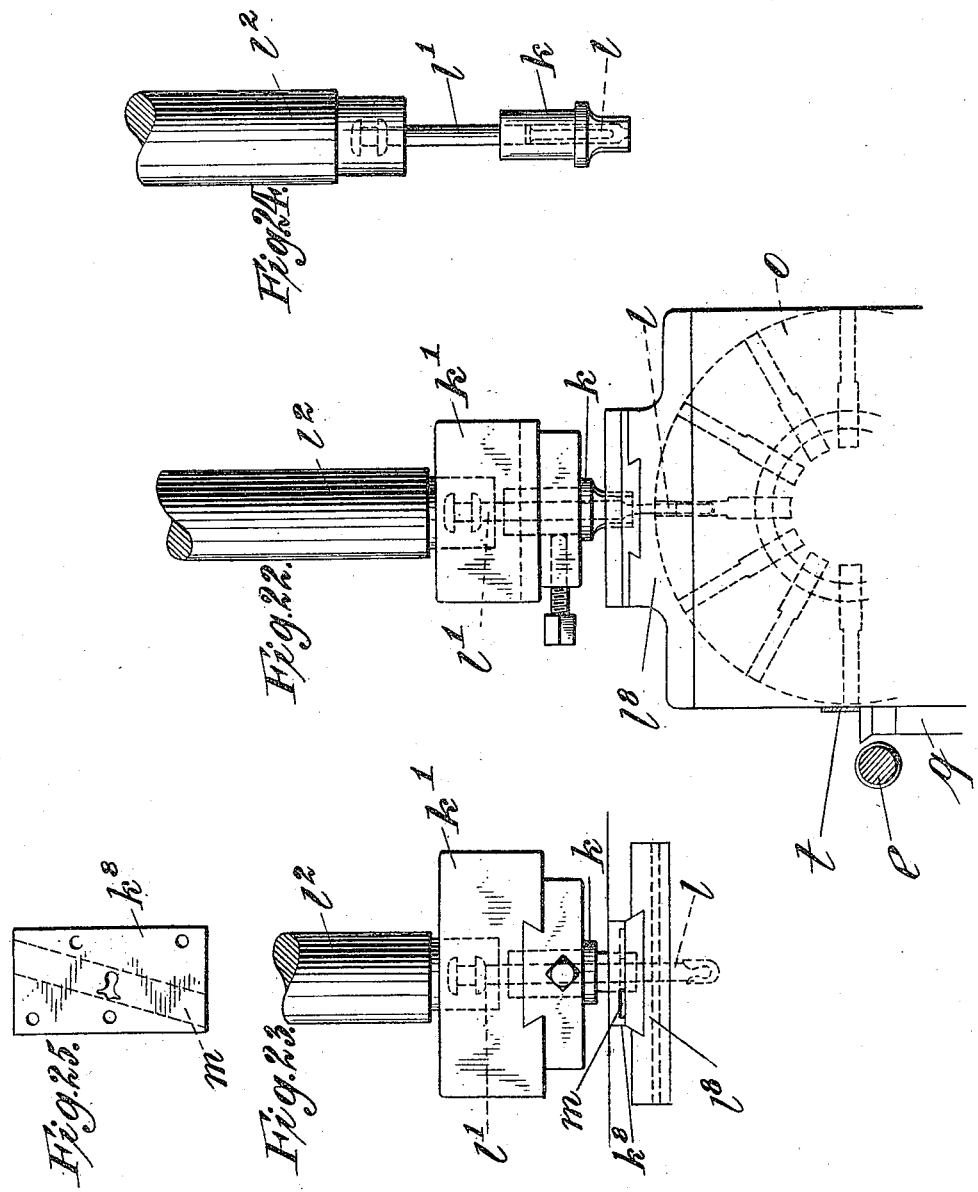

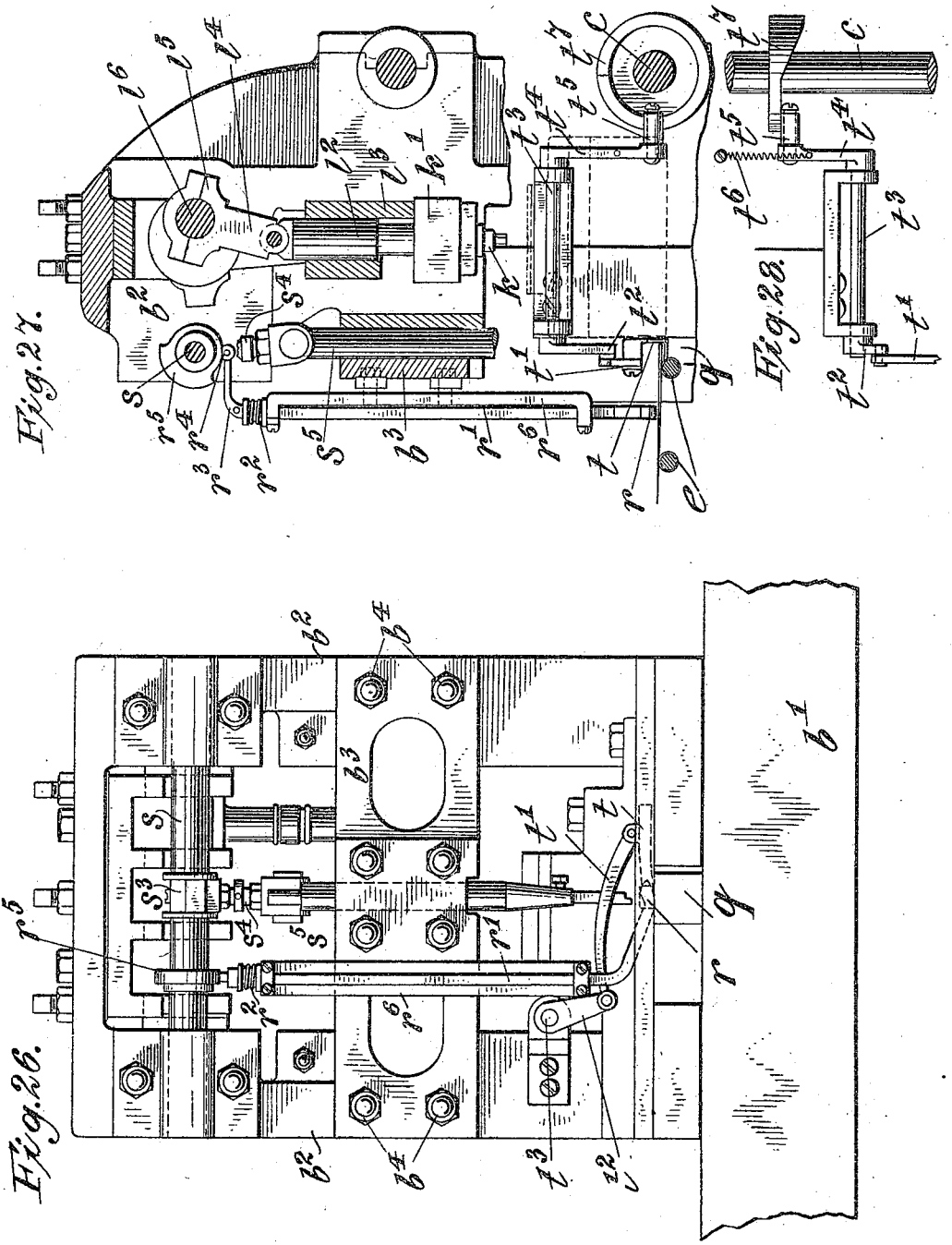

UNITED STATES PATENT OFFICE.

HERBERT B. CHURCH, OF BLOOMFIELD, NEW JERSEY, ASSIGNOR TO CONSOLIDATED SAFETY PIN COMPANY, OF BLOOMFIELD, NEW JERSEY, A CORPORATION OF NEW JERSEY.

MACHINE FOR MAKING SAFETY-PINS.

962,126. Specification of Letters Patent. Patented June 21, 1910.

Application filed May 16, 1908. Serial No. 433,181.

*To all whom it may concern:*

Be it known that I, HERBERT B. CHURCH, a citizen of the United States, residing in Bloomfield, in the State of New Jersey, have invented certain new and useful Improvements in Machines for Making Safety-Pins, of which the following is a specification, reference being had to the accompanying drawings, forming a part hereof.

This invention relates to machines for making safety pins of the character of the machines shown and described in part in Letters Patent of the United States No. 349,226, dated September 14, 1886, and the object of the invention is particularly to improve the operation of that machine in certain respects, as will be more particularly pointed out hereinafter. The drawings of the patent above mentioned show only so much of the machine as is involved in the application of the sheet metal heads to the wire blanks, but inasmuch as the present invention has to do not only with the devices for forming and applying the sheet metal heads, but with the means for operating such devices and with the means for preparing the wire blanks for the application of the sheet metal heads and the presentation of such blanks to the devices for applying the heads, the machine is illustrated, in the accompanying drawings, practically in its entirety.

In the drawings—Figure 1 is a view in front elevation of a machine which embodies the present invention, the legs being partly broken off to save space. Fig. 2 is a top view of the same. Fig. 3 is a view of the machine in end elevation, as seen from the right hand in Fig. 1. Fig. 4 is a detail view, partly in end elevation and partly in section, on the plane indicated by the line 4—4 of Fig. 2. Fig. 5 is a detail top view, partly broken out, illustrating particularly the means for supporting and adjusting the belts by which the wire blanks are rotated during the grinding of the points thereof. Figs. 6 and 7 are views in front elevation and in transverse section of some of the parts shown in Fig. 5. Fig. 8 is a top view of the means for supporting and adjusting the rotary files by which the pin points are formed. Figs. 9 and 10 are views in front and end elevation of the same parts shown in Fig. 8, the gearing being indicated by dotted lines in Fig. 10. Figs. 11 and 12 are views in end and front elevation of the devices for holding the pin points upon the rotary files. Figs. 13 and 14 are views in front elevation and transverse section showing a modification of the means for holding the pin points against the rotary files. Figs. 15 and 16 are respectively a plan view and a view in elevation, partly in section, showing the devices for bending the head end of the wire blank. Fig. 17 is a view in front elevation of the machine head, partly broken out, illustrating particularly the mechanism directly involved in the formation of the sheet metal heads. Fig. 18 is a view, partly in elevation and partly in section, showing some of the parts which appear in Fig. 17 as seen from the right hand in Fig. 17, the punch for applying the sheet metal heads to the wire being also shown. Fig. 19 is a detail view in front elevation of the punch for applying the sheet metal heads to the wire blanks. Figs. 20 and 21 are detail views, partly in plan and horizontal section and partly in elevation and vertical section respectively, showing particularly the rotary carrier for the sheet metal heads and the means for actuating the same. Figs. 22, 23 and 24 are detail views showing particularly the construction and operation of the punches for blanking out and drawing up the sheet metal heads. Fig. 25 is a plan view of the die plate which coöperates in the formation of the blanks for the sheet metal heads. Fig. 26 is a view in front elevation of the machine head, similar to Fig. 17, but showing particularly the punch for applying the sheet metal heads to the wire blanks, the device for holding each wire blank during the application of the sheet metal head, and the shutter for preventing the backward movement of the pin during the application of the head, together with their actuating mechanism, these devices having been omitted from Fig. 17 to permit illustration of parts which stand behind them. Fig. 27 is a detail view of some of the parts shown in Fig. 26 as seen from the right hand in Fig. 26. Fig. 28 is a top view of the devices for operating the shutter.

Power may be applied to the machine through a pulley $a$ on a counter-shaft $a'$ which is mounted in suitable bearings in the standards $b$ which support the bed plate $b'$. From the shaft $a'$ power is transmitted through the pulley $a^2$, belt $a^3$ and pulley $a^4$ to a short shaft $a^5$. Upon the latter is a pinion $a^6$ which meshes with a large gear $a^7$ on the main shaft $c$ which is mounted in suitable bearings and extends the length of the machine. From the shaft $c$ all working parts of the machine are driven except the rotary files, hereinafter referred to, which are driven from the shaft $a'$.

In order that the detail description which follows may be the more readily comprehended, the general operations performed by the machine will first be briefly mentioned. The wire is drawn from a reel, not shown, through a wire straightening device and is cut off in proper lengths by a feeding and cutting device which is represented at $d$ in Figs. 1, 2 and 3, being operated from a crank disk $d'$ on the end of the shaft $c$.

The construction and operation of the feeding and cutting device form no part of the present invention and therefore need not be further referred to herein.

As the lengths of wire are cut off they fall upon spirally grooved conveyer shafts $e$ which are driven through suitable gearing from a gear $e'$ on the shaft $c$ and convey the pin wires through the machine until the completed pins are discharged at the ends of the shafts. The nature and mode of operation of these conveyer shafts are sufficiently described in said Letters Patent of the United States No. 349,226, hereinbefore mentioned, and need not be further described. As the pin wires are conveyed through the machine, they are first pointed by contact with rotary files, being themselves rotated at the same time, are then bent at the head end to receive the head, are placed in position to have the sheet metal heads applied to the wires, the sheet metal heads being themselves formed in the machine and properly delivered for application to the pin wires and the wires are then coiled and are discharged in completed condition ready for plating, polishing, etc.

While the wires are being pointed by the pointing devices, hereinafter described, they are rotated. This rotation is effected by belts $f$, (see particularly Figs. 1, 2, 5, 6 and 7) the pin wires resting meanwhile upon tables $f'$. The belts $f$ are carried by pulleys $f^2$, which are secured to shafts $f^3$, $f^4$, mounted in suitable standards erected on the bed plate. One of the shafts, as the shaft $f^4$, is shorter than the shaft $f^3$ and carries a gear $f^5$ which meshes with a gear $f^6$ on another short shaft $f^7$. The shafts $f^3$ and $f^7$ are provided each with a worm gear $f^8$ which meshes with a corresponding worm $f^9$ on the shaft $c$, whereby the belts $f$ are driven at a relatively slow speed and the rotation of the pin wires is effected. The shafts $f^4$ and $f^7$, with their gears, are carried by a standard $f^{10}$ which is mounted adjustably on the bed plate $b'$ so as to permit the belts to be stretched somewhat tightly, the adjustment of the standard $f^{10}$ being conveniently effected by a screw $f^{11}$ mounted on the bed plate. The lower limb of each belt $f$ must be held at a fixed distance from the corresponding table $f'$ and one part or another of such limb should also be capable of adjustment toward or from the table as may be rendered desirable by the action of the several files, which act differently upon the pin wires. To accomplish this a main presser bar $f^{12}$, preferably having flanged side bars $f^{13}$, to form a longitudinal, channel supporting bar, is itself carried by bridges $f^{14}$ over the lower limb of each of the belts $f$, each bridge being provided with set screws $f^{15}$ to bear upon the corresponding end of the bar $f^{12}$, whereby the bar may be pressed more or less toward the corresponding table $f'$. Sectional pressers $f^{16}$, supported by the channel main bar $f^{12}$, are arranged to bear upon the belt $f$ and each sectional presser is adjusted by a corresponding set screw $f^{17}$ threaded in the main bar $f^{12}$ and bearing upon an arched spring $f^{18}$, the ends of which rest upon the corresponding sectional presser $f^{16}$. By this means each entire series of sectional pressers may be moved bodily toward or from the lower limb of the corresponding belt and one end of the series may be moved more or less than the other end, and each sectional presser may be adjusted independently of the rest so that the pressure with which the pins are held between the moving belt $f$ and the corresponding table may be regulated to suit the action of the corresponding file and the proper rotation of each pin wire upon its own axis be secured while the wire is being carried along the conveyers $e$ and is having its point formed by the rotary files.

The means for adjustably supporting and the means for rotating the rotary files are shown particularly in Figs. 8, 9 and 10, the files themselves being shown in their general relation to the other parts of the machine in Figs. 1 and 2. In the former machine, which it is the particular object of this invention to improve, the file shaft was mounted in bearings which were connected only through the shaft and hence were liable to become disalined; the belt pulley for the file was mounted directly on the file shaft and being necessarily of small diameter the tension of the driving belt was necessarily great, and the adjustment of the file was not easily accomplished. In the improved machine each rotary file $g$ is mounted in vertical arms $g'$ rising from a cradle $g^2$ which also carries in suitable bearings the belt pulley $g^3$. The shaft of the latter carries a large gear $g^4$ which meshes with a pinion $g^5$ on the shaft of the file $g$. The cradle $g^2$ is adapted to be adjusted in position, both in a horizontal plane and in a vertical plane, the supporting and adjusting means being of such a character that the vertical adjustment is not affected by changing the horizontal adjustment. The cradle rests upon the horizontal upper surface of wedge shaped blocks $g^6$ which are respectively connected by links $g^7$ to blocks $g^8$ secured to the underside of the bed plate $b'$, the blocks being, therefore, free to move vertically but held from substantial movement in a horizontal plane. The extent of the horizontal upper surface of each block is sufficient to permit all necessary movement of the cradle in a horizontal plane, such cradle having a foot $g^{2x}$, preferably rounded, to rest upon the block. The inclined lower surface of the wedge shaped block $g^6$ rests in turn upon the correspondingly inclined upper surface of a wedge shaped block $g^9$ which is carried by a horizontally adjustable frame $g^{10}$, conveniently supported at one end by the bracket $g^8$ and at the other end by a horizontal pin $g^{11}$ and engaged by an adjusting screw $g^{12}$ which may be threaded in the front flange of the bed plate $b'$. Against the forward edge of the cradle $g^2$ bear two adjusting screws $g^{13}$ and connected to the cradle by a swinging joint is an adjusting screw $g^{14}$ which receives, outside of the front flange of the bed plate $b'$, locking-nuts $g^{15}$. It will now be understood that by adjustment of the set screws $g^{13}$ and nuts $g^{15}$ on the screw $g^{14}$, the cradle $g^2$, carrying the file $g$, may be adjusted in a horizontal plane according to requirements, and that by adjustment of the screws $g^{12}$, which move the wedge shaped blocks $g^9$ with respect to the wedge shaped blocks $g^6$, the desired vertical adjustment of the cradle with the file may be effected. Furthermore, as the cradle rests always upon the horizontal upper surface of the compound wedge, the adjustment of the cradle in a horizontal plane does not affect in any respect that adjustment of the cradle in a vertical plane which may have been found to be proper. Likewise, the adjustment of the cradle in a vertical plane does not affect that adjustment thereof in a horizontal plane which may have been found to be proper.

By reason of the flexibility of the pin wires and of the distance which necessarily exists between the files and the support of the pins by the nearest table $e$, it is desirable to provide means for supporting the pin wires close to the points thereof where they are acted upon by the files. The means which are preferably employed for the purpose are shown particularly in Figs. 11 and 12. As there represented, the points of the pin wires, while they are in contact with the file, are supported from below by a plate $h$ which is mounted on the bed plate or upon the cradle in rear of the file, being bent, as clearly shown in Fig. 11, having its upper edge suitably beveled, so as to support each pin wire as close as possible to the point thereof while it is being operated upon by the file. The pin points are supported from above, so as to be held in contact with the files, by a plate $h'$ which is carried by arms $h^2$. The arms $h^2$ are held to the supports $g'$ for the file by screws $h^3$ and are also provided, above and below each screw $h^3$, with set screws $h^4$ which bear against the supporting arms $g'$. By properly adjusting the screws $h^3$ and $h^4$ the edge of the plate $h'$ may be adjusted with reference to the horizontal plane of the pin wires so as to hold the points more or less closely upon the files.

In the construction shown in Figs. 13 and 14 the under supporting plate $h$ and the upper supporting plate $h'$ are both supported from standards $h^5$ erected on the bed plate, through the medium of suitable adjusting devices, the two plates being connected so as to move together. The upper plate $h'$ is secured to a block $h^6$ which loosely engages a block $h^7$; the latter is provided with set screws $h^8$ which bear against the plate $h'$ to adjust it in a horizontal plane with set screws $h^9$ which bear upon the upper edge of the plate $h'$ to adjust it about a horizontal axis. The block $h^7$ is hung from a screw threaded block $h^{10}$ adjustable vertically in a sleeve $h^{11}$ which in turn is rotatably adjustable in the head of the standard $h^5$ and is secured in adjusted position by set screws $h^{12}$. By these means it is possible to effect very delicate adjustment of the plates $h$ and $h'$ with respect to the files $g$ so as to properly guide and hold the points of the pin wires with respect to the files.

Before the metal head is applied to the pin wire the latter must be bent slightly. In the old machine this bending of the head was effected by two punches, acting one after the other. In the present machine the whole operation is performed by one movement and by one cam, the pin meanwhile being properly held. As is well understood, and as is fully described in said Letters Patent No. 349,226, the grooves of the spiral conveyers $e$ are carried about the shafts in a plane at right angles to the axes thereof whereupon the forward movement of the pin is to be momentarily stopped in order to permit the same operation to be performed upon it. The mechanism which bends the head end of the pin wire while its forward movement is thus temporarily stopped, is shown in detail in Figs. 15 and 16. It comprises an anvil $i$, suitably located with reference to the head end of the pin wire and having its rear side beveled off, as clearly shown in Fig. 16, so that the pin wire may be properly bent upon the head of the anvil, a punch $i'$, the working face of which conforms to the head of the anvil and to the bend which it is desired the pin wire shall have, and a holder $i^2$ by which the pin wire is held firmly upon the anvil during the operation of bending. The punch $i'$ is carried by a lever $i^3$, which is operated at the proper time by a cam $i^4$ on the shaft $c$. The hold $i^2$ is also carried by the lever $i^3$, but is mounted yieldingly thereon, having a pin and slot connection $i^{4\times}$ with the lever and being pressed down by a reasonably stiff spring $i^5$ which is secured to the lever. A spring $i^6$ acts upon the lever to raise its forward end after operation. When the pin wire is in position over the anvil $i$, as shown in Fig. 16, the cam $i^4$ acts upon the lever $i^3$ to depress its forward end over the pin wire. The holder or presser $i^2$ first makes contact with the pin wire, holding it firmly in position upon the anvil, and then yielding upward during the further downward movement of the forward end of the lever during which the punch $i'$ strikes the pin wire and bends it down over the anvil, the entire operation of forming the head bend of the pin wire being thus performed by the single movement of a single cam.

After the pin wire has received the head bend, as already described, it passes on to the point where it receives the sheet metal head. In the old machine this head was first blanked out by a blanking punch from a strip of sheet metal and the head blank was then moved into line with the drawing punch, by which the head was drawn up and was afterward fed into the rotary carrier by which is was moved into proper position with respect to the pin wire and from which it was then discharged and pressed upon the pin wire. In the improved machine, the blanking and drawing punches act in the same line, the drawing punch moving through the blanking punch, and both act directly in line with the rotary head carrier, so that at one operation a sheet metal head is formed and is transferred directly to the rotary carrier.

The means for supporting and actuating the blanking and drawing punches are shown particularly in Figs. 17 and 18, while the details of construction of the two punches and the relations thereof to the blanking die and to the rotary head conveyer are shown particularly in Figs. 22, 23 and 24, and the details of construction of the rotary head carrier and its operating means are shown particularly in Figs. 20 and 21.

The blanking punch $k$ is carried by a cross head $k'$ which is connected by links $k^2$ with eccentric straps $k^3$, the latter engaging eccentrics $k^4$, one of which is shown by dotted lines in Fig. 18, on the head shaft $k^5$ mounted in suitable bearings in the head frame $b^2$ provided with a fly wheel $k^6$ and driven by gears $k^7$ from the shaft $c$. The blanking punch $k$ is perforated longitudinally to permit the movement through it of the drawing punch $l$, which is shown in dotted lines in Figs. 22, 23 and 24, the stem $l'$ of the drawing punch being shown clearly in Fig. 24. This is carried by a plunger $l^2$ mounted in a suitable guide $l^3$ above the cross head $k'$ and connected by a link $l^4$ with an eccentric strap $l^5$ which encircles an eccentric $l^6$ formed on the shaft $k^5$ between the eccentrics $k^4$. The blanking punch $k$ coöperates with a blanking die $k^8$, shown in plan view in Fig. 25, which is mounted directly over the drawing die $l^8$, both the blanking die and the drawing die being directly mounted over the rotary head conveyer, hereinafter referred to. The strip of sheet metal from which the heads are formed is led through a guide-way $m$ formed therefor in the holding plate above the blanking die $k^8$ and is fed forward, step by step, by feed rolls $m'$ driven through a ratchet and pawl mechanism $m^2$ and a link $m^3$ from a crank pin $m^4$ adjustable in a grooved disk $m^5$ on the end of the shaft $k^5$, as shown particularly in Figs. 2 and 3. It will now be understood that through the coöperation and relation of the blanking punch and the drawing punch the sheet metal head, the shape of which when formed, as indicated by dotted lines in Fig. 23, is formed and delivered into the rotary head conveyer, practically at one operation and without requiring any shifting of the blank from one point to another.

The construction and operating mechanism of the rotary head carrier, into which each sheet metal head is delivered by the drawing punch and by which it is transferred to a point where it is ejected and applied to the pin wire, differ somewhat from the construction and operating mechanism of the rotary head shown and described in said Letters Patent No. 349,226, and will now be described, reference being had particularly to Figs. 2, 4, 17, 18, 20 and 21. The rotary carrier is mounted on a short shaft $n$ (Figs. 2, 4 and 20) which is driven, step by step, by a pawl and ratchet mechanism $n'$, operated by an eccentric $n^2$ on the shaft $c$. Secured to the shaft $n$ (Figs. 20 and 21) is the carrier proper $o$ having an annular rim $o'$ with a central chamber $o^2$. In the annular rim $o'$ are mounted radially movable fingers $o^3$, each of which is adapted to receive, in a recess $o^4$ formed in the outer end thereof, a sheet metal head, and each of which is pressed normally inward by a suitable spring $o^5$. A plunger $o^6$, having a finger $o^7$ which enters the central recess $o^2$ in the carrier $o'$ and stands in line with that receiving finger $o^3$ which stands in the forward horizontal position is operated by a cam $o^8$ on the shaft $c$ to thrust the receiver $o^3$ forward at the proper time and thereby deposit the sheet metal head in position to be clamped upon the pin wire. A tooth locking wheel $p$ is secured upon the shaft $n$ and is engaged by a plunger latch $p'$ operated through a spring pressed bell crank lever $p^2$ from a cam $p^3$ on the shaft $c$, whereby the carrier is locked firmly in position at the time when a sheet metal head is to be ejected from the carrier and placed in position for application to the pin wire.

It will be understood that the carrier $o$ is located immediately below the blanking and forming dies, as clearly indicated in Figs. 17 and 18, and that when it is locked against movement, as just described, one of the receivers $o^3$ is in line with the forming die so that the same movement of the forming punch which forms the head also transfers it to the receiver $o^3$ which is then in position to receive it.

The mechanism for closing the sheet metal head upon the end of the pin wire, the mechanism for holding the pin wire during this operation, and the mechanism for preventing movement of the pin wire or the head back into the carrier are particularly shown in Figs. 3, 18, 19, 26, 27 and 28, these parts being omitted from Figs. 1, 2 and 17, in order to permit the parts behind them to be more clearly shown. During the operation of closing the head upon the pin wire, the end of the pin wire, bent as already described, rests upon an anvil $q$ and is pressed upon the same by a presser foot $r$. The latter is carried by a vertical rod $r'$, suitably guided on the press or head frame and lifted by a spring $r^2$. At its upper end the rod carries an arm $r^3$ provided with a roller $r^4$ which bears against a cam $r^5$ on a shaft $s$ mounted near the top of the press or head frame. The rotation of the cam $r^5$ causes the presser foot $r$ to be moved down to hold firmly against the anvil $q$ the pin wire which at that time is receiving its sheet metal head and has temporarily ceased its forward movement.

The shaft $s$, which carries the cam $r^5$, and also actuates the closing down punch, as hereinafter described, is driven by gears $s'$, shown in plan view in Fig. 2 and in elevation by dotted lines in Fig. 3, from the shaft $b^4$ and is mounted in suitable bearings at the top and front of the press or frame head $b^2$. It is provided with an eccentric $s^2$ which, through a strap $s^3$ and link $s^4$ operates the plunger rod $s^5$ which is guided in a bar $b^3$ secured to the front of the press frame, and carries the closing down punch $s^6$ (see Figs. 18 and 19), which at the proper time acts upon the sheet metal head, after it has been ejected from the carrier $o$, to clamp it firmly upon the bent end of the pin wire. The cross bar $b^3$, which carries the plunger $s^5$ and the guide $r^6$ for the rod $r'$, is secured to the press frame by bolts $b^4$. By simply withdrawing these bolts the cross bar $b^3$ with the plunger $s^5$ and the presser rod $r'$, and their connections can be swung upward on the shaft $s$ as a center, thereby giving free access to the blanking and forming dies and the rotary carrier, and permitting the removal of the rotary carrier and its connections without entirely taking down the machine.

In order to prevent the movement of the head or the pin wire or both backward into the rotary carrier, a shutter $t$ is provided and is arranged to slide to and fro between the rotary carrier and the screw conveyer shafts $e$, standing across the orifice through which the heads are ejected from the rotary carrier while the head is being applied to the pin wire in line therewith. The shutter is connected by a link $t'$ to a crank arm $t^2$ on a shaft $t^3$ mounted in suitable bearings carried by the press frame $b^2$. The end of the shaft carries a crank arm $t^4$ with a roller $t^5$ held by a spring $t^6$ against a cam $t^7$ on the shaft $c$. After the sheet metal head has been applied to the pin wire, the onward movement of the pin wire by the conveyer shafts $e$ is continued and the pin wire is bent and coiled so as to complete the formation of the pin. The devices which are involved in the bending and coiling of the pin wire are substantially the same as in the old machine and need not be further described herein. They are illustrated generally, in Figs. 1 and 2, at the left of the press or head frame.

It will be evident that various changes in details of construction and arrangement of parts may be made to suit different conditions of use and that the invention is not to be limited to the precise construction and arrangement shown and described herein.

I claim as my invention:

1. In a machine for making safety pins, a reciprocating blanking punch having a longitudinally extending passage; means for operating said blanking punch; a forming punch located within said passage and capable of reciprocating movement therein and relatively to said blanking punch; means for operating said forming punch; dies with which said punches coöperate to cut out and bend sheet metal heads for the pins; a rotary carrier located beneath said dies and adapted to receive heads formed by said blanking and forming punches and comprising a body portion and a plurality of head receiving fingers carried by and movable in a radial direction with reference to said body portion; means for rotating said carrier in a series of step by step movements; means for locking said carrier against movement during the intervals between said step by step movements; means for conveying pin wires past said rotary carrier and for causing them to pause as they arrive at a position opposite said carrier; means engaging said receiving fingers in succession as they come into a position adjacent the pin wires for moving each successive finger radially with reference to said carrier to thereby carry the head which it holds to and place it upon the pin wire; a reciprocating punch adapted to engage the head and to close it about and upon the pin wire; and means for operating said several elements in proper sequence.

2. In a machine for making safety pins, a reciprocating blanking punch having a longitudinally extending passage; means for operating said blanking punch; a forming punch located within said passage and capable of reciprocating movement therein and relatively to said blanking punch; means for operating said forming punch; dies with which said punches coöperate to cut out and bend sheet metal heads for the pins; a rotary carrier located beneath said dies and adapted to receive heads formed by said blanking and forming punches and comprising a body portion and a plurality of head receiving fingers carried by and movable in a radial direction with reference to said body portion; means for rotating said carrier in a series of step by step movements; a toothed wheel carried by and rotatable with said carrier; a latch adapted to engage said toothed wheel during the intervals between said step by step movements; means for operating said latch to release said toothed wheel when said carrier is to be moved; means for conveying pin wires past said rotary carrier and for causing them to pause as they arrive at a position opposite said carrier; means engaging said receiving fingers in succession as they come into a position adjacent the pin wires for moving each successive finger radially with reference to said carrier to thereby carry the head which it holds to and place it upon the pin wire; a reciprocating punch adapted to engage the head and to close it about and upon the pin wire; and means for operating said several elements in proper sequence.

3. In a machine for making safety pins &c., the combination of a press frame, two shafts mounted in the upper part thereof, blanking and forming punches operatively connected to one of said shafts, a closing down punch and a presser operatively connected to the other of said shafts and standing in front of the blanking and forming punches, and guide supports for the closing down punch and presser secured to the press frame, whereby, upon disconnecting said guide supports from the press frame the closing down punch and presser may be turned up about their operating shaft to permit access to the blanking and forming punches.

4. In a machine for making safety pins &c., the combination of conveying means for the pin wires, means for presenting the sheet metal heads to the pin wires, means for closing down the heads upon the pin wires, and a shutter and means to move the same into the line of each pin wire to prevent longitudinal movement thereof during the application of the head thereto.

This specification signed and witnessed this 1st day of May A. D., 1908.

HERBERT B. CHURCH.

Signed in the presence of—
AMBROSE L. O'SHEA,
W. B. GREELEY.